United States Patent [19]

Zoller

[11] Patent Number: 5,364,483
[45] Date of Patent: Nov. 15, 1994

[54] THICK BODIED HEAT SET MOLDING

[75] Inventor: Robert A. Zoller, Bay Village, Ohio

[73] Assignee: The Standard Products Company, Cleveland, Ohio

[21] Appl. No.: 909,704

[22] Filed: Jul. 7, 1992

[51] Int. Cl.$^5$ .............................................. B29C 41/02
[52] U.S. Cl. .................................... 156/242; 156/245; 428/31; 264/DIG. 60
[58] Field of Search ................... 156/242, 245; 428/31; 264/45.5, 212, 213, 214, 248, 299, DIG. 59, DIG. 60

[56] References Cited

U.S. PATENT DOCUMENTS

| | | | |
|---|---|---|---|
| 2,772,194 | 11/1956 | Fisher et al. | 264/DIG. 60 |
| 2,929,778 | 4/1961 | Simons | 264/DIG. 60 |
| 2,966,469 | 12/1960 | Smythe et al. | 264/DIG. 60 |
| 3,616,099 | 10/1971 | Shanok et al. | |
| 3,837,984 | 9/1974 | Wagner et al. | |
| 3,852,389 | 12/1974 | Adler et al. | 264/DIG. 60 |
| 4,101,698 | 7/1978 | Dunning et al. | |
| 4,260,655 | 4/1981 | Zoller | |
| 4,351,868 | 9/1982 | Otani | |
| 4,360,549 | 11/1982 | Ozawa et al. | |
| 4,369,608 | 1/1983 | Miura et al. | |
| 4,451,518 | 5/1984 | Miura et al. | |
| 4,498,697 | 2/1985 | McGlone et al. | |
| 4,515,744 | 5/1985 | Stamper et al. | 264/DIG. 60 |
| 4,563,141 | 1/1986 | Zoller | |
| 4,569,880 | 2/1986 | Nishiyama et al. | |
| 4,668,543 | 5/1987 | Schlenz | |
| 4,695,501 | 9/1987 | Robinson | |
| 4,800,116 | 1/1989 | Ventimiglia et al. | 264/DIG. 60 |
| 4,824,617 | 4/1989 | Takeuchi et al. | 264/DIG. 60 |
| 4,868,021 | 9/1989 | Zoller | |
| 4,911,959 | 3/1990 | Miyakawa | |
| 5,238,622 | 8/1993 | Grimmer | 264/DIG. 60 |

*Primary Examiner*—Caleb Weston
*Attorney, Agent, or Firm*—Harness, Dickey & Pierce

[57] ABSTRACT

A trim strip which has a thick body portion is formed with a fused outer perimeter. The central portion generally remains in a partially fused or incompletely fused state reducing cost while providing a trim strip with a pleasing aesthetic appearance.

5 Claims, 3 Drawing Sheets

THICK BODIED HEAT SET MOLDING

BACKGROUND OF THE INVENTION

The present invention relates to trim strips or moldings and, more particularly, to a thick bodied trim strip or molding having a fused exterior perimeter.

Several problems have developed in molding operations manufacturing thick bodied trim strips. One of these problems is the time necessary to manufacture the trim strip. The shorter the manufacturing time, the more cost effective it is to manufacture the trim strip. Also, the amount and cost of the material needed to manufacture the thick bodied trim strips must be taken into consideration. Generally, these disadvantages have limited the desire to manufacture thick bodied trim strips.

The present invention provides the art with a relatively inexpensive method to manufacture a thick bodied trim strip. The method of the present invention utilizes plastisol materials to form a thick bodied trim strip with a fused outer perimeter providing an aesthetic appearance. The outer perimeter fusing requires less time which, in turn, reduces the overall cost of the operation.

From the following detailed description taken in conjunction with the accompanying drawings and claims, other objects and advantages will become apparent to those skilled in the art.

BRIEF DESCRIPTION OF THE DRAWINGS

FIG. 4 is a schematic view of a station layout for manufacturing trim strips of the present invention.

DETAILED DESCRIPTION OF THE PREFERRED EMBODIMENT

Figure 1:
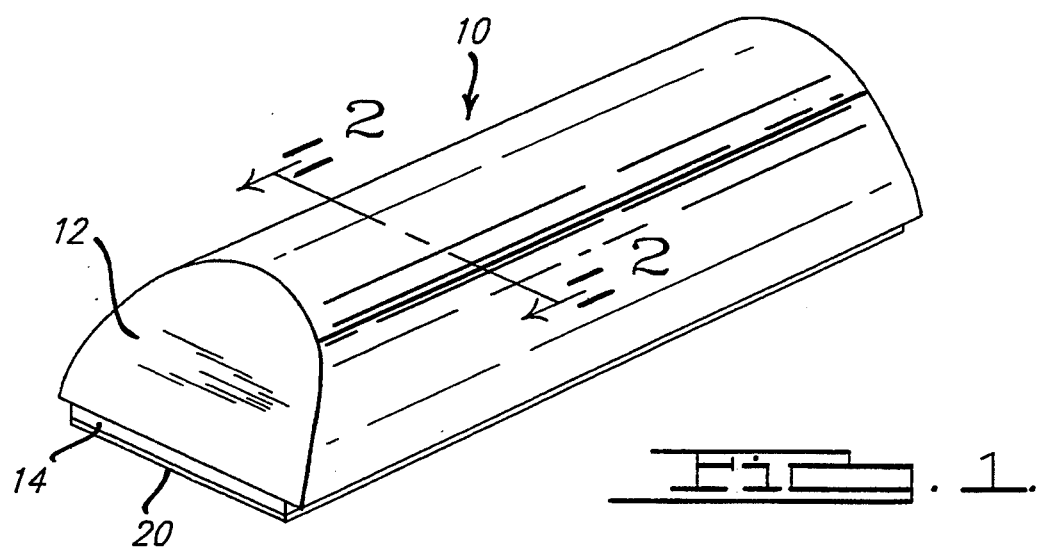
FIG. 1 is a perspective view Of a trim strip in accordance with the present invention.
Figures 2, 3:
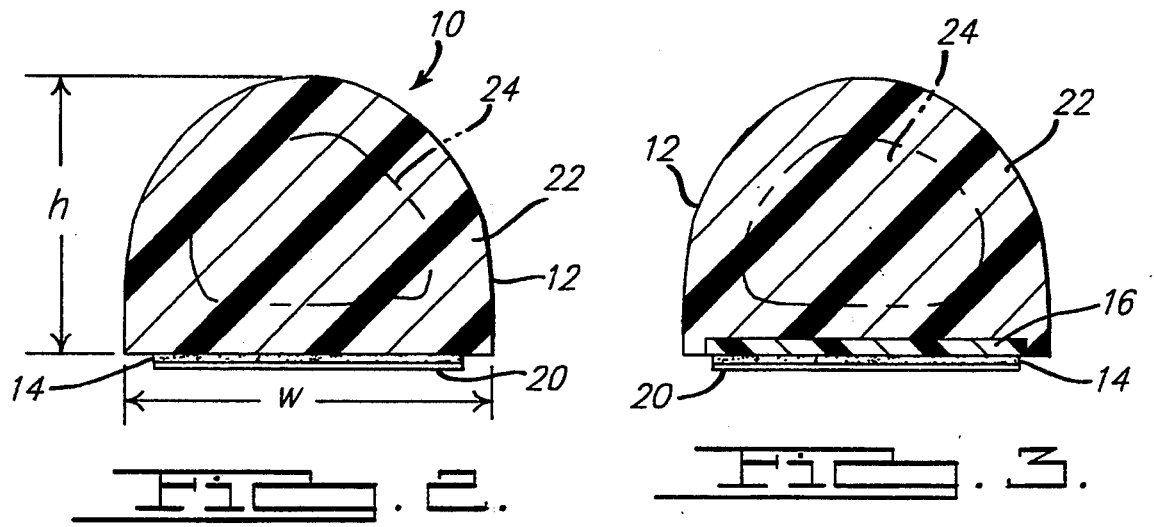
FIG. 2 is a sectional view of FIG. 1 through lines 2—2 thereof.
FIG. 3 is a sectional view like that of FIG. 2 of another embodiment of the present invention.

Turning to the figures, particularly FIGS. 1 through 3, a trim strip is illustrated in accordance with the present invention. The trim strip 10 is an elongated member including a thickened body 12 and an adhesive tape member 14.

Turning to FIG. 3, a base 16 may also be applied to the thickened molding 12. The base may be extruded or provided from a roll of stock material. The base is a film of polyvinyl chloride material, which is relatively hard or stiff, to provide rigidity to the trim strip. The base may also be made of metal, such as aluminum. Also, the base may act as a barrier to prevent migration of plasticizer from the thickened body 12. Also, the base may include an adhesive member 14.

The present invention has features similar to that of U.S. patent applications Ser. No. 619,126, filed Nov. 28, 1990, entitled "Plastic Heat Set Molding"; Ser. No. 703,242, filed May 20, 1991, entitled "Trim Strip With One Piece Heat Set Plastic Cover Over Metal Core"; Ser. No. 750,885, filed Aug. 26, 1991, entitled "Plastic Heat Set Molding"; and Ser. No. 790,091, filed Nov. 15, 1991, entitled "Plastic Heat Set Molding" all to the same Applicant and all assigned to the same Assignee, the specifications and drawings of which are expressly incorporated by reference.

The thickened body member 12 is made from a liquid vinyl chloride resin elastomer material, which is generally known as plastisol. Plastisol is available in a number of colors to enable the trim strip to be colored to a manufacturer's specification. The thickened body member may be directly bonded to a base, as shown in FIG. 3 or, may have the adhesive tape member directly applied thereto, as shown in FIG. 2.

Generally, as will be explained herein, the thickened body portion is formed such that the outer perimeter 22 is fused with respect to the central portion 24 which is generally incompletely fused, or left in a somewhat non-hardened state.

When referring to a thick body portion, generally the strip has a height dimension h such that the height dimension is 0.30 inch or greater. Utilizing the plastisol enables formation of the thick bodied trim strips.

The adhesive tape member 14 is generally of the two faced adhesive type. The tape may have substantially minimal thickness or it may be of the foam type. Generally, a release layer 20 is on the outside of the adhesive member, which is removed upon positioning the trim strip onto the surface.

Moving to FIGS. 4 through 9, a better understanding will be achieved of the method of manufacturing the trim strip in accordance with the present invention.

If a base member is to be utilized, it may be purchased on a coil and cut to a desired width or it may be extruded prior to attachment to the thickened body. Also, the adhesive tape would be added to the backing member prior to the coupling with the thickened body portion. Also a liquid chemical primer may be added to the hard base material to enhance the bond strength to the thickened body member 12.

Figure 5:
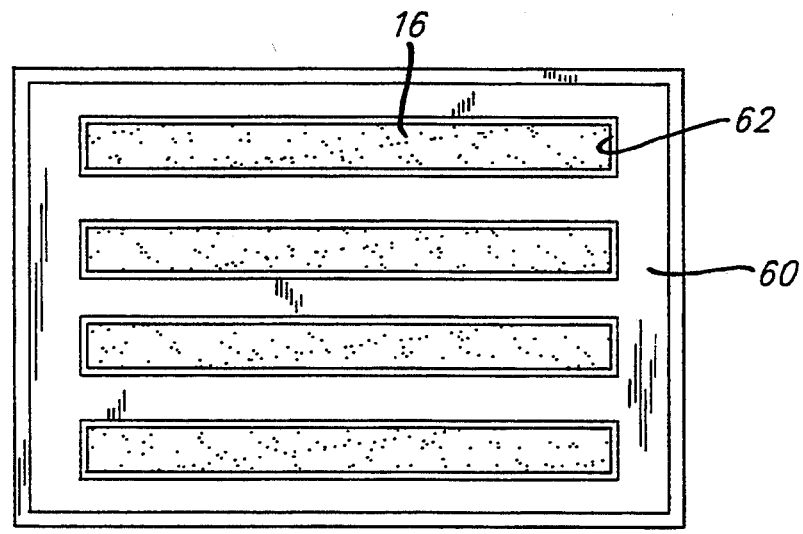
FIG. 5 is a schematic view of a molding apparatus for manufacturing trim strips in accordance with the present invention.

FIGS. 4 and 5 illustrate molding apparatus for manufacturing the thick body portion 12. FIG. 4 shows a layout for mold stations 42, 44, 46 and 48 where an operator would receive, if utilized, a supply of backing members 16 to position them in the molds, as will be explained, with respect to FIG. 5.

In FIG. 4, the mold station 42 is shown with a pouring apparatus, mold station 44 is shown in the heating mode, mold station 46 is shown in the cover position and mold station 48 is shown in the cooling mode. Once trim strips are formed, the operator would place the finished trim strips into a receiving container 70.

Figure 7:
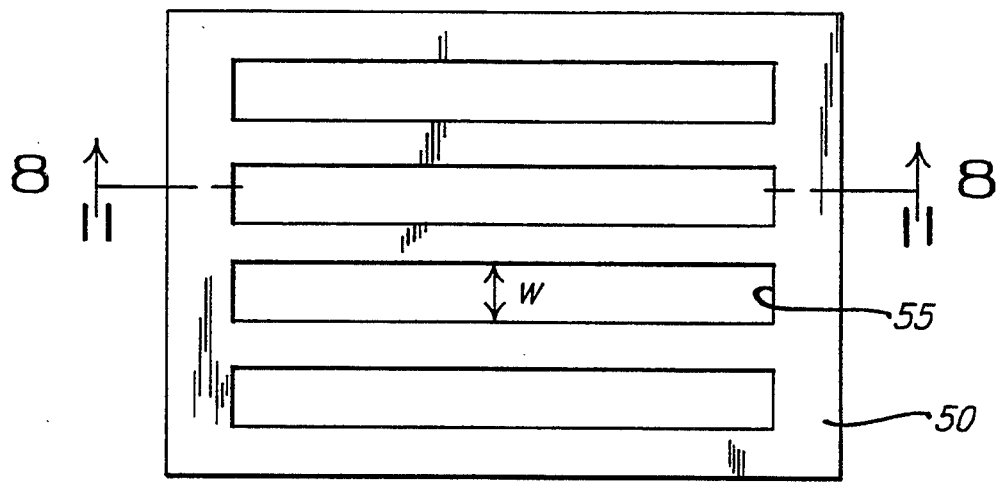
FIG. 7 is a plan view of a mold in accordance with the present invention taken along line 7—7 thereof of FIG. 5.
Figure 8:
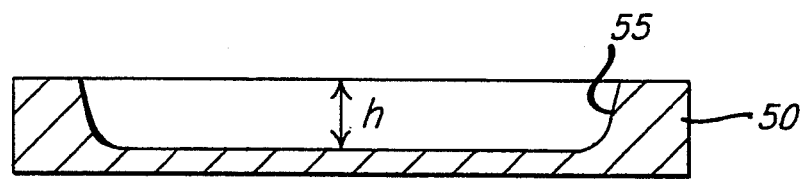
FIG. 8 is a sectional view of a mold of FIG. 7 taken along line 8—8 thereof.
Figure 9:
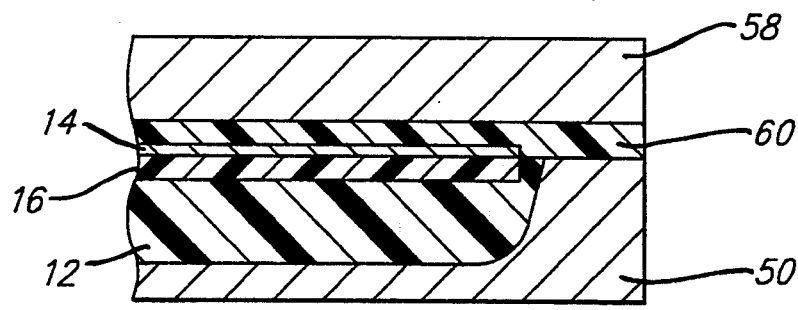
FIG. 9 is an enlarged partial sectional view taken when the cover plate is covering the mold of FIG. 7.

The mold stations 42, 44, 46 and 48 are substantially identical and are best illustrated in FIG. 5. Each mold station includes a lightweight mold 50, movable heaters 52 and 54, cooling spray nozzle 56 and a cover assembly 58. The mold 50 as best seen in FIGS. 7 through 9, may be stationarily or movably positioned on the apparatus so that the mold 50 is substantially level with respect to the horizontal. This enables the liquid plastisol to be poured into the mold 50 and seek its own level so as to be substantially level in the mold cavities. The mold 50 generally has four cavities 55, however, a number of different cavities could be provided. The mold cavities 55 are relatively deep, having a depth of 0.30 inch or greater.

Liquid plastisol is poured into the mold cavities 55 and is heated to temperature to form or fuse the outer periphery 22 of the plastisol to an elastomeric mass with a partially fused or incompletely fused center area 24 in the mold, while the mold is opened or uncovered. Generally, a temperature of approximately 210° C. will solidify the outer periphery of the trim strip. The heating process generally takes up to two to five minutes, depending upon the mold size.

Figure 6:
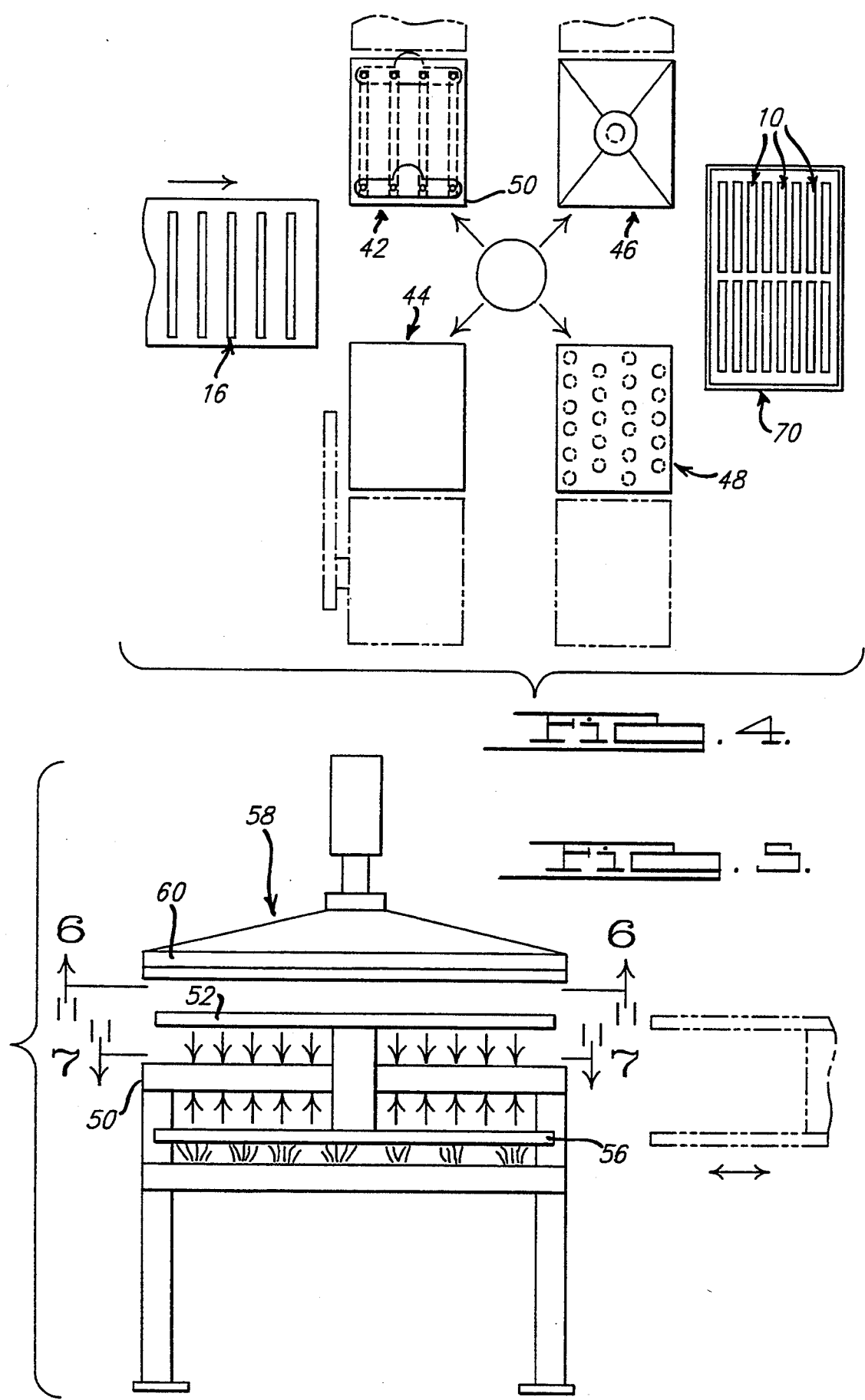
FIG. 6 is a plan view of FIG. 5 of the upper plate along line 6—6 thereof.

After the cycle for the top heater 52 is completed and the heater withdrawn, the cover assembly, if necessary, is lowered onto the mold 50. The cover assembly 58, which includes a cover plate 60, holds a corresponding number of optional backing members 16. As best illustrated in FIG. 6, the plate 60 includes a resilient heat resistant layer, preferably silicone rubber, having a series of holding pockets 62 to receive the backing members. The pocket 62 may include a vacuum assist to hold the backing members into the pocket. Also, the resilient heat resistant layer may be eliminated and the backing members held in position on the plate with the vacuum assist. The plate 60 is aligned with the mold 50 such that the backing members are positioned to mate with the surface to form the trim strip 10. At the end of the heating cycle, the plate is lowered onto the mold such that the base members of the backing members contact the heated plastisol within the molding cavity as illustrated. This contacting enables the backing member to bond to the thickened body 12 forming an integral trim strip.

After the backing members have been in contact with the thickened body 12 for a desired period of time, the water spray nozzles are activated to cool the mold 50. Upon cooling, the trim strips are formed and removed from the mold. Since the heating and cooling steps take place at substantially zero pressure, the trim strips do not encounter sink problems. Likewise, the molds may be movable and the spray nozzles and heaters stationary. Thus, depending upon the design of the apparatus, the majority of the components may be movable to accomplish the manufacturing of the trim strip. Since little or substantially no pressure is utilized during the molding operation, the tooling cost of the mold or die is substantially reduced.

When forming a trim strip like that of FIG. 2, the above backing strip step would be eliminated. The strip would be cooled and the adhesive member 14 added directly to the thick body portion 12 to form the trim strip. Also, the subject molding process inherently forms trim strips which are color multi-directional. Thus, a trim strip is manufactured from a molding operation that does not utilize high pressures commonly encountered during conventional injection molding.

While the above detailed description describes the preferred embodiment of the present invention, the invention is susceptible to modification, variation, and alteration without deviating from the scope and fair meaning of the subjoined claims.

What is claimed is:

1. A method of forming a thick trim strip comprising:
   providing a mold having at least one deep cavity;
   adding a desired amount of heat settable material into said mold;
   heating said mold containing said desired amount of heat settable material;
   fusing an outer perimeter of said heat settable material such that material surrounded by said outer perimeter is incompletely fused;
   forming a trim strip from said heat settable material; and
   removing said trim strip from said mold.

2. The method according to claim 1 further comprising adding a backing member to said heat settable material.

3. The method according to claim 1 further comprising securing an attaching means for attaching said trim strip to a surface.

4. The method according to claim 1 further comprising cooling said trim strip prior to removal from said mold.

5. The method according to claim 1 wherein said mold cavity has a depth of about 0.30 inch or greater.

* * * * *